Patented Aug. 21, 1945

2,383,179

UNITED STATES PATENT OFFICE 2,383,179

MANUFACTURE OF VINYL AROMATICS

Gustav Egloff, Chicago, Ill., assignor to Universal Oil Products Company, Chicago, Ill., a corporation of Delaware No Drawing. Application February 11, 1942, Serial No. 430,487

3 Claims. (Cl. 260—669)

This invention is concerned with processes for the manufacture of vinyl aromatics such as styrene.

It is more specifically concerned with the use of particular catalysts to foster the reactions occurring between aromatics and low-boiling paraffin and olefin hydrocarbons so that substantial yields of the desired compounds are obtained.

Styrene is at present an important base material for the manufacture of resins and rubber substitutes. It readily polymerizes in the presence of catalysts to form resins of varying consistency and can be made to undergo copolymerization with low molecular weight conjugated dienes such as butadiene and isoprene to form heavy polymers having the essential properties of rubber produced by the coagulation of natural latexes. Styrene is produced in small yields as a by-product in the coal tar and manufactured gas industries and can be produced in relatively small yields by the high temperature pyrolysis of various hydrocarbons and hydrocarbon fractions such as those obtained from petroleum and coal tars. The catalytic dehydrogenation of ethylbenzene has recently been employed to augment the amount of styrene available commercially. The present process is a further contribution to the problem of styrene production.

In one specific embodiment the present invention comprises a process for the manufacture of vinyl aromatics which consists in interacting aromatic and paraffinic and/or olefinic hydrocarbons in the presence of catalysts having hydrocarbon dehydrogenating activity. The reactions of the present process are typified by those which occur between benzene and either ethane or ethylene in the presence of dehydrogenating catalysts and these basic reactions are indicated in the two equations following.

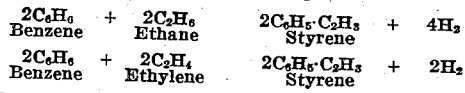

From the above equations it can be seen that the function of the dehydrogenating catalysts is to produce the vinyl radical for addition to the benzene nucleus. It is difficult to state what constitutes the exact reaction mechanism on account of the difficulties inherent in isolating intermediate reaction products but it is probable that this is the essential mechanism of the reactions. The dehydrogenating action of the preferred catalysts may, and evidently does, lead to the shifting of hydrogen but it is difficult to follow the details of such reactions.

The catalysts which are preferred for use in the present process include a considerable number having varying degrees of activity in the dehydrogenation of various types of hydrocarbons. These catalysts include the metals of the iron group, iron, nickel and cobalt and also the elements of the platinum group or palladium group of group VIII of the periodic table although between the two groups, the iron group will be favored on account of lower cost. The iron group metals, when freshly produced by the reduction of their oxides have very high dehydrogenating catalytic activity under moderate temperature conditions and are particularly effective in splitting off hydrogen from paraffins and naphthene hydrocarbons to produce, in the first instance, mono- and diolefins and, in the second instance, aromatics.

Another group of catalysts which may be used effectively in the present process consists of the oxides and particularly the lower oxides of the elements in the left-hand columns of groups IV, V and VI of the periodic table. In this category the elements of group IV include titanium, zirconium, cerium, hafnium and thorium; those of group V include vanadium, columbium and tantalum and those of group VI include chromium, molybdenum, tungsten and uranium. These particular dehydrogenating oxide catalysts are most active when produced by the decomposition of their salts such as the nitrates or when precipitated as hydrates which are dehydrated by the application of heat and they are best utilized on carrying or supporting substances among which may be mentioned the refractory non-reducible oxides such as those of aluminum and magnesium, natural or synthetically prepared silicates such as clays particularly those of the montmorillonite and bentonite type either raw or acid treated, zeolites, kieselguhr, pumice and other relatively inert refractory materials. The composites consisting of a relatively inactive and an active oxide may be prepared by absorbing or precipitating salts or hydrates on prepared granules of the supports such as, for example, those prepared by pelleting powders or the catalysts may be made by precipitating or absorbing the hydroxides on finely divided supports followed by pilling of the partly or completely dried materials. While a large number of alternatively utilizable catalyst composites are thus included in this present cateory, it is to be understood that they do not have exactly equivalent effectiveness in the reaction of the present process but that this activity may vary considerably. For example, catalysts containing chromium sesqui-oxide, $Cr_2O_3$, deposited on such supports as activated alumina produced by heating natural or precipitated aluminum hydrates to temperatures of the order of 500° C. will have unusually good activity and, similar composites containing vanadium, molybdenum and cerium oxides on a similar support will have comparable activity. The other oxides in the group mentioned will have sufficient activity to warrant their utilization but their activity will usually not be as high as the activity of the oxides of chromium, vanadium, molybdenum and cerium.

In the operation of the present process when using the wide variety of catalysts suggested, temperatures of from about 400 to about 900° C. may be employed in different cases involving the use of different catalysts. Low pressures are favored and in some instances best results may be obtained when subatmospheric pressures are employed though, as a rule, atmospheric or slightly superatmospheric pressures up to 50 pounds per square inch are preferable in commercial operations. The rates of flow of reactants over contact materials will also require determination in small scale experiments before plants are designed for larger scale operations.

The operations of the present process are relatively simple and comprise merely the passing of proportioned mixtures of aromatics and either paraffins or mono-olefins over beds of prepared granular catalysts such as, for example, pellets of alumina supporting chromium sesqui-oxide. Good results are obtained when employing equimolecular proportions of reactants such as benzene and ethane or benzene and ethylene but the exact proportioning of the reactants will depend upon the activity of the catalyst chosen. The reactants may be diluted, if desired, with relatively inert gases such as hydrogen, nitrogen, methane and steam. The processes are usually operated by passage of the reactants over a catalyst until its activity begins to diminish noticeably due to the gradual deposition of carbonaceous substances on its active surfaces and, to insure continuity of operations, the catalyst beds may be employed in parallel connection so that as the catalytic activity of one unit drops below a practical point, the stream of reactants may be diverted to a fresh bed of catalyst while the spent catalytic material from the preceding period is reactivated by burning off the carbonaceous deposits with oxidizing gas mixtures such as combustion gases containing controlled amounts of oxygen and finally air.

In the case of the reaction between benzene and ethane as typifying those between aromatics and paraffins, generally higher temperatures will be employed than in the case of reactions between benzene and ethylene and lower temperatures will generally be employed with the more active catalysts in the groups described. Reaction ranges will vary with temperature and catalyst activity so that higher rates of flow will be possible with more active catalysts and higher temperatures.

The following example indicates the type of results characteristically obtainable in the operation of the present process but its insertion is intended in no wise to unduly limit the scope of the invention.

The dehydrogenating catalyst is prepared by impregnating a commercial activated alumina in powdered form with a solution of chromium trioxide. The powdered alumina is suspended in a concentrated chromic acid solution until the required amount of chromium oxide is absorbed after which the remaining solution is filtered off and the alumina containing chromium trioxide heated to a temperature of 500° C. for 3 hours to partially dehydrate the alumina and produce chromium sesqui-oxide from the chromium trioxide. The final catalyst composition is 88% $Al_2O_3$ to 12% $Cr_2O_3$. The prepared material is pelleted into ⅛ inch pellets by the use of a commercial type machine and the pellets are then charged to a reaction chamber. An equimolecular mixture of benzene and ethylene is then preheated to a temperature of 550° C. and passed through the catalyst bed at atmospheric pressure and a rate corresponding to 5 volumes of liquid charge per volume of catalyst space per hour. There is produced in this operation a once-through yield of styrene equal to 25% of the value theoretically obtainable and by recycling unconverted hydrocarbons this yield is raised to 55%.

I claim as my invention:

1. A process for the manufacture of styrene which comprises subjecting a mixture of benzene and ethane at a temperature of from about 400 to about 900° C. to contact with an alumina-chromia catalyst.

2. A process for the manufacture of styrene which comprises subjecting a mixture of benzene and ethylene at a temperature of from about 400 to about 900° C. to contact with an alumina-chromia catalyst.

3. A process for producing styrene which comprises interacting benzene and a $C_2$ aliphatic hydrocarbon at a temperature of from about 400° C. to about 900° C. and in the presence of a catalyst comprising alumina and chromia.

GUSTAV EGLOFF.